(12) United States Patent
Armand et al.

(10) Patent No.: US 9,923,235 B2
(45) Date of Patent: Mar. 20, 2018

(54) HYBRID ELECTROLYTE

(71) Applicant: CIC ENERGIGUNE, Miñano, Álava (ES)

(72) Inventors: Michel Armand, Álava (ES); Irune Villaluenga, Álava (ES); Teófilo Rojo Aparicio, Álava (ES)

(73) Assignee: CIC ENERGIGUNE, Miñano, Álava (ES)

( * ) Notice: Subject to any disclaimer, the term of this patent is extended or adjusted under 35 U.S.C. 154(b) by 657 days.

(21) Appl. No.: 14/415,397

(22) PCT Filed: Jan. 21, 2013

(86) PCT No.: PCT/EP2013/051023
§ 371 (c)(1),
(2) Date: Jan. 16, 2015

(87) PCT Pub. No.: WO2014/012679
PCT Pub. Date: Jan. 23, 2014

(65) Prior Publication Data
US 2015/0188189 A1 Jul. 2, 2015

Related U.S. Application Data

(60) Provisional application No. 61/716,664, filed on Oct. 22, 2012.

(30) Foreign Application Priority Data

Jul. 19, 2012 (EP) ..................... 12382290

(51) Int. Cl.
| | | |
|---|---|---|
| H01M 10/0565 | (2010.01) | |
| C09C 1/30 | (2006.01) | |
| H01M 10/052 | (2010.01) | |
| H01M 10/054 | (2010.01) | |
| H01M 10/056 | (2010.01) | |
| H01B 1/12 | (2006.01) | |

(52) U.S. Cl.
CPC ....... *H01M 10/0565* (2013.01); *C09C 1/3063* (2013.01); *C09C 1/3072* (2013.01); *C09C 1/3081* (2013.01); *H01B 1/122* (2013.01); *H01M 10/052* (2013.01); *H01M 10/054* (2013.01); *H01M 10/056* (2013.01); *C01P 2002/85* (2013.01); *C01P 2002/88* (2013.01); *C01P 2004/04* (2013.01); *C01P 2006/40* (2013.01); *H01M 2300/0065* (2013.01); *H01M 2300/0082* (2013.01)

(58) Field of Classification Search
CPC ........... H01M 10/0565; H01M 10/052; H01M 10/056
See application file for complete search history.

(56) References Cited

U.S. PATENT DOCUMENTS 5,569,560 A 10/1996 Olsen et al.

FOREIGN PATENT DOCUMENTS

| WO | 98/59388 A1 | 12/1998 |
| WO | 2009/050042 A1 | 4/2009 |
| WO | 2010083041 A1 | 7/2010 |

OTHER PUBLICATIONS

Nugent, J.L. et al., "Nanoscale Organic Hybrid Electrolytes," Adv. Mater. 2010, 22, pp. 3677-3680.
Lu, Y. et al., "Ionic liquid-nanoparticle hybrid electrolytes," J. Mater. Chem., 2012, 22, pp. 4066-4072.
Schaefer, J.L., et al., "Nanoporous hybrid electrolytes," J. Mater. Chem., 2011, 21, 10094-10101.
Kumar, Deepak and Hashmi, S.A., "Ion transport and ion-filler-polymer interaction in poly(methyl methacrylate)-based, sodium ion conducting, gel polymer electrolytes dispersed with silica nanoparticles," J. Power Sources , 2010, 195, 5101-5108.
Kumar, Deepak and Hashmi, S.A., "Ionic liquid based sodium ion conducting gel polymer electrolytes," Solid State Ionics, 2010, 181, pp. 16-423.
Walcarius, Alain, "Electrochemical Applications of Silica-Based Organic-Inorganic Hybrid Materials," Chem. Mater. 2001, 13, pp. 3351-3372.
International Search Report dated Mar. 6, 2013 for PCT/EP2013/051023.

*Primary Examiner* — Ula C Ruddock
*Assistant Examiner* — Thomas H. Parsons
(74) *Attorney, Agent, or Firm* — Knobbe, Martens, Olson & Bear, LLP

(57) ABSTRACT

A nanoparticulate organic hybrid material comprising inorganic nanoparticles covalently grafted with at least one anion of an organic sodium or lithium salt is provided. In addition, a process for preparing the nanoparticulate organic hybrid material and its use in the preparation of electrolytes suitable for lithium and sodium secondary batteries are provided.

16 Claims, 12 Drawing Sheets

HYBRID ELECTROLYTE

CROSS REFERENCE TO RELATED APPLICATIONS

This application is the U.S. National Phase of International Application No. PCT/EP2013/051023, filed Jan. 21, 2013, designating the U.S. and published in English as WO 2014/012679 on Jan. 23, 2014 which claims the benefit of European Patent Application No. 12382290.0, filed Jul. 19, 2012 and U.S. Provisional Application No. 61/716,664, filed Oct. 22, 2012.

FIELD OF THE INVENTION

The present invention relates to nanoscale organic hybrid materials (NOHMs), methods of making NOHMs and their use in the preparation of electrolytes suitable for its incorporation in lithium and sodium secondary batteries.

BACKGROUND

Solid-state batteries are referred in the state of the art as electrochemical cells containing at least an anode, a cathode and a solid electrolyte. These cells offer a number of advantages over electrochemical cells containing a liquid electrolyte, especially improved safety features.

The secondary batteries with the highest energy density used today use lithium, wherein lithium ions are the active charge carrying species. Advanced secondary lithium battery systems require electrolytes with specific properties such as wide electrochemical stability windows, high mechanical strength alone or when imbibing a porous separator, and/or chemical inertness or non-solvency towards the electrode materials at any stage of charge or discharge. It is also desirable that electrolytes are non-flammable, non-volatile, do not leak and are non-toxic, making them safer both in use and after disposal. In pursuit of such materials, several classes of electrolytes have been studied as replacement for conventional liquid electrolytes, either of inorganic or organic nature: polymers, polymer composites, hybrids, gels, ionic liquids and ceramics.

Typical materials used for the manufacture of solid electrolytes can be inorganic matrices, such as β-alumina and Nasicon, sulfide glasses in the $SiS_2+Li_2S+LiI$ system or simple Lithium halide with enhanced grain boundaries defect induced by nanoparticles oxides, like silicon dioxide. All these are brittle materials where the volume changes inevitable during operation induce stress and possible cracks in the electrolytes. In order to have electrolytes compliant with volumes changes, the use of organic polymeric matrices is preferred. Typical examples include polyethylene oxide, polypropylene oxide or polyethyleneimine and their copolymers. These materials are used in combination with a suitable lithium salt, such as lithium tetrafluoroborate ($LiBF_4$) and lithium bis(triflruoromethane sulfonyl imide [$Li(CF_3SO_2)_2N$] referred in the following as LiTFSI.

Conductivity levels sufficient for battery operation ($10^{-5}$-$10^{-3}$ S·cm$^{-1}$) are only obtained above room temperature, from 50 to 80° C.

The polymers containing the $(CH_2CH_2O)_n$ repeat unit are the most conductive, and the polymers containing this unit have been most studied. The tendency for segments with $n \geq 15$ to crystallize require to function above the melting point, as only the amorphous phase is conducting, whether this sequence is in copolymers of the random type or block, or of comb type. However, at the temperature of operation, the polymers have insufficient mechanical properties to act as an electrolyte and separator in a battery. This is especially true when lower $M_w$ α-ωmethyl-end-capped polyoxyethene unit with $4 \leq n \leq 20$ (known ad PGDME) are used as additive to plasticize the membrane. Crosslinking is usually necessary to improve the mechanical resistance, which in turn decrease the thermal motion of the chains, hence the conductivity. The cross-linking process is usually slow and diminishes the speed of battery production.

The main disadvantage of all these polymer electrolytes is the ambipolar conductivity. When a current is applied, both the anions and cations are mobile, then ≈⅓ of the current through the electrolyte is transported by the cation and ⅔ by the anion. This aspect is quantified by the transport number $t_+$ defined as $t_+=\sigma_{cation}/\sigma_{cation}+\sigma_{anion}=D_{cation}/D_{cation}+D_{anion}$; σ and D being the conductivity and diffusion of each charges species. In most battery electrode systems, only cations react at the electrodes, so eventually the electroneutrality results in an accumulation of salt in the vicinity of the anode and salt depletion close to the cathode. Both over-concentrated and depleted electrolyte have a far lower conductivity, thus the polarization of the cell increases markedly with a reduction in power capability.

Some attempts have been proposed in order to overcome these problems. For example, U.S. Pat. No. 5,569,560 describes the use of an anion complexing agent comprising polyamines with the strong electron-withdrawing unit $CF_3SO_2$ attached to slow-down the anions, thus allowing the lithium cations to carry a larger fraction of the current in an electrochemical cell. The effect on the transport number $t_+$ is however minimal. Recently, solvent-free, hybrid electrolytes based on nanoscale organic/silica hybrid materials (NOHMs) have been prepared with lithium salts [Nugent, J. L. et al., *Adv. Mater.*, 2010, 22, 3677; Lu, Y. et al., *J. Mater. Chem.*, 2012, 22, 4066]. Such electrolytes have uniformly dispersed nanoparticle cores covalently to which polyethylene glycol (PEG) chains are covalently bonded. These electrolytes are self-suspended and provides homogeneous fluids where the PEG oligomers simultaneously serve as the suspending medium for the nanoparticle cores and as ion-conducting network for lithium ion transport.

WO2010/083041 also discloses hybrid electrolytes based on NOHMs comprising a polymeric corona attached to an inorganic nanoparticle core, being the polymeric corona doped with lithium salts.

Schaefer, J. L. et al. (*J. Mater. Chem.*, 2011, 21, 10094) also describes hybrid electrolytes based on $SiO_2$ nanoparticles covalently bonded to a dense brush of oligo-PEG chains, doped with a lithium salt, in particular lithium bis(trifluromethanesulfone imide). This electrolyte is prepared in polyethylene glycol dimethyl ether (PEGDME) which provides an excellent ion conductivity. However, the anion of the lithium salt freely moves through the electrolyte and ⅔ of the current is carried by anions, thus generating a high concentration polarization, and therefore an internal resistance and voltage loss.

In all these three last examples, the fact that the free salt is dissolved in the grafted PEG parts of these nano composites means that the transport number $t_+$ is $<<1$, having as result the same concentration polarization during battery operation.

On the other hand, recent investigation is focused on the development of sodium-ion secondary batteries in which sodium ion is employed in place of lithium ion. The use of sodium as the electrochemical vector for batteries is becoming increasingly popular, as sodium is much more abundant than lithium, and for large-scale applications, like electrical grid storage, it becomes mandatory. However, sodium insertion electrodes undergo large volume changes during operation, and besides, the non-compliant solid electrolyte interface at the electrolyte/electrode surface is much less favorable for sodium. This suggests again the use of polymer electrolytes which are compliant for volume changes and far more stable than conventional carbonate solvents. However, fewer studies than for Li have been devoted to polymer Na-ion batteries. Sodium batteries electrolytes have the same requirement as for lithium, to have the highest possible transport number $t_+ \approx 1$ to avoid concentration polarization.

In this sense, Kumar, D. (*J. Power Sources*, 2010, 195, 5101-5108) discloses sodium ion conducting, gel polymer electrolyte nanocomposites based on poly(methyl methacrylate) and dispersed with unfunctionalized silica nanoparticles. However, only a slight enhancement in the sodium ion transport is observed due to the dispersion of silica nanoparticles in the gel system.

Kumar (*Solid State Ionics*, 2010, 181, 416-423) also describes other sodium ion conducting gel polymer electrolyte which comprises a solution of sodium triflate ($NaCF_3SO_3$) in an ionic liquid 1-ethyl-3-methyl imidazolium trifluoro-methane sulfonate, immobilized in poly(vinylidene fluoride-co-hexafluoropropylene). Similarly, the anions needed to compensate the charge of the organic cation and of sodium have a far higher concentration and mobility than that of the latter ion.

In view of that, there is still a need to develop lithium and sodium secondary batteries comprising solid electrolytes with improved mechanical properties and ionic conductivity selective to $Li^+$ or $Na^+$ cations. A $t_+$ of $\approx 1$ is, in addition to avoid concentration polarization, the best strategy to avoid the growth of dendrites for Li or Na metal electrodes, which have intrinsically higher energy densities than Li-ion and Na-ion systems.

BRIEF DESCRIPTION OF THE INVENTION

The authors of the present invention have developed a new solvent-free nanoscale organic hybrid material in which the anion of a lithium or sodium salt is covalently grafted in the surface of inorganic nanoparticles. The anchorage of the anion by covalent bonds to the nanoparticles by means of a hydrocarbon arm avoids concentration gradients, with only lithium or sodium cations mobile, without decrease in ionic conductivities. Additional advantages conferred by the hybrid material of the invention are good mechanical properties due to the hard nanoparticles preventing creep under pressure, without the need for cross-linking and good electrochemical stability window.

Thus, a first aspect of the present invention refers to a nanoparticulate organic hybrid material comprising inorganic nanoparticles covalently grafted with at least one anion of an organic sodium or lithium salt through a linker group, said nanoparticulate hybrid material having the following formula (I):

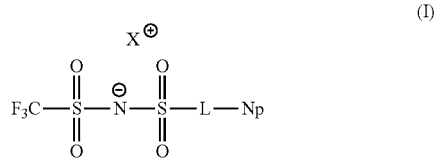
(I)

wherein:
Np represents the inorganic nanoparticle;
L is the linker group selected from $C_1$-$C_6$ alkylene and phenyl-$C_1$-$C_4$-alkylene group,

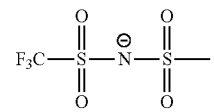

is the anion of the organic sodium or lithium salt,
and
$X^+$ is a sodium or lithium cation.

In a particular embodiment, the inorganic nanoparticles are further grafted with at least one organic polymeric segment.

Another aspect of the invention relates to a process for the preparation of a nanoparticulate hybrid material as defined above, said process comprising reacting a compound of formula (III):

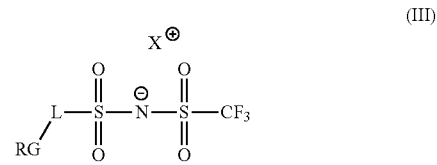
(III)

wherein:
RG is a reacting group;
L is a $C_1$-$C_6$ alkylene or phenyl-$C_1$-$C_4$-alkylene group; and
$X^{(+)}$ is a cation of a base,
with an inorganic nanoparticle,
in the presence of an inorganic sodium or lithium salt.

An additional aspect of the invention refers to an electrolyte suitable for its use in a sodium or lithium battery, said electrolyte comprising a nanoparticulate hybrid material as defined above. In particular, the grafted nanoparticles can be used alone or can be dispersed in PEG (polyethylene glycol), PEGDME (polyethylene glycol dimethyl ether), mixtures thereof or in a polymer comprising a high fraction (≥60%) of $CH_2CH_2O$ units, optionally plasticized with PEGDME, organic cyclic carbonates, γ-butyrolactone or tetralkyl sulfamides.

Finally, another aspect of the invention includes sodium or lithium battery which comprises an electrolyte as defined above.

DETAILED DESCRIPTION OF THE INVENTION

Figure 1:
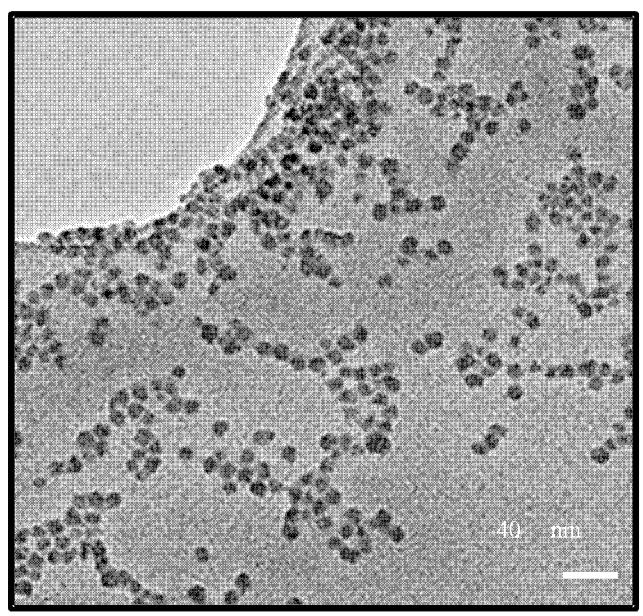
FIG. 1 shows the characterization of $SiO_2$ nanoparticles grafted with the anion of the sodium salt ($SiO_2$-anion) by Transmission Electron Microscopy (TEM).

The present invention relates to a nanoparticulate organic hybrid material (NOHM) comprising an inorganic nanoparticle core to which an organic sodium or lithium salt is covalently attached.

The sodium or lithium salt derives from a highly delocalized anion which is attached to the nanoparticle through an organic hydrocarbon linker (L group).

The inorganic nanoparticle is therefore covalently grafted with at least one anion of the sodium or lithium salt remaining said anion anchored to the nanoparticle, with only sodium or lithium cations being mobile.

The structure of the nanoparticulate organic hybrid material of the invention is shown below:

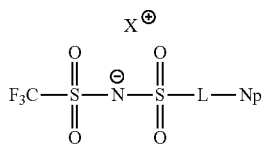

wherein:
Np represents the inorganic nanoparticle;
L is a linker group selected from $C_1$-$C_6$ alkylene and phenyl-$C_1$-$C_4$-alkylene group,

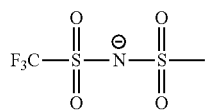

is the anion of the organic sodium or lithium salt,
and
$X^+$ is a sodium or lithium cation.

By the term "inorganic nanoparticle" it is understood an inorganic physical entity, which is independent and observable, whose effective size in at least one dimension is less than 1 µm, i.e. a size between 1 and 999 nm, preferably between 1 and 500 nm, more preferably between 1 and 100 nm, even more preferably between 1 and 50 nm, and much more preferably between 1 and 10 nm. Nanoparticles have a very high surface area to volume ratio which allows attaching numerous organic fragments on the surface of the nanoparticles. Extensive libraries of nanoparticles, composed of an assortment of different sizes, shapes, and materials, and with various chemical and surface properties, have been constructed. In this regard, a variety of nanoparticles can be used as cores, including multi-lobed nanoparticles, conductive nanoparticles, metal nanoparticles, hollow nanoparticles, quantum dots, nanocrystals, magnetic nanoparticles, metal nanoparticles, metal oxide nanoparticles and nanorods.

In a particular embodiment, the inorganic nanoparticle is composed of a material selected from the group consisting of a metal oxide, a metal and a metal salt. Examples of metal oxides include $SiO_2$, $SnO_2$, $Fe_2O_3$, $Fe_3O_4$, $Co_3O_4$, $MgO$, $SrO$, $BaO$, $CaO$, $TiO_2$, $ZrO_2$, $FeO$, $V_2O_3$, $V_2O_5$, $Mn_2O_3$, $NiO$, $CuO$, $Al_2O_3$, $ZnO$, $Ag_2O$. Metal oxides include both oxides, metal hydroxides, metal hydrated oxides, metal oxohydroxides or metal oxoperoxohydroxides. Examples of metals include Y, Zr, La, Ce, Mg, Sr, Ba, Ca, Ti, Fe, V, Mn, Ni, Cu, Al, Si, Zn, Ag, Au or Co.

In a preferred embodiment, nanoparticles are composed of a metal oxide, more preferably is $SiO_2$.

The inorganic nanoparticles may be grafted with a single anion of the organic lithium or sodium salt or with multiple anions of the lithium or sodium salt. Preferably, the nanoparticles are grafted with 1 to 100 anions of the lithium or sodium salt, more preferably with 1 to 20 anions of the lithium or sodium salt.

The anion of the organic sodium or lithium salt is covalently bonded to the inorganic nanoparticle through a linker group. In a particular embodiment, said linker group (L) is a $C_1$-$C_6$ alkylene group. The term "alkylene" refers to a straight or branched divalent hydrocarbon residue, containing no insaturation, having one to six carbon atoms, and which is attached to the nanoparticle by a single bond and to the sulfonyl group by the other single bond, e.g., methylene, ethylene, n-propylene, n-butylene, pentylene, hexylene, and isomers. In a preferred embodiment, L is a propylene group —$(CH_2)_3$—.

Other L may be found with a phenylene group intercalated between the alkylene and the $SO_2$ group. In fact, in a preferred embodiment, L is a phenylene-$C_1$-$C_4$-alkylene group, more preferably is phenylene ethylene —$(C_6H_4)$ $CH_2CH_2$—.

In a preferred embodiment, the linker L is selected from —$(CH_2)_3$— and phenyl-$CH_2$—$CH_2$—

In another preferred embodiment, cation $X^+$ is sodium.

In a particular embodiment, the nanoparticulate hybrid material which is grafted with the anion of the sodium or lithium salt has an organic content of less than 50%, more preferably the organic content ranges from 10 to 25%.

In another preferred embodiment, nanoparticles are further grafted with at least a single organic polymeric segment of a polymer material selected from polyethers, polyesters, polyamides, polysiloxanes, polysulfides, polysulfonates, polysulfonamides, poly(thio ester)s, polyamines and block-copolymers.

Preferred organic polymeric materials are polyethylene glycol (PEG), polyethylene oxide (PEO) and polyoxyethylene (POE). In a preferred embodiment, the organic polymer material is polyethylene glycol, even more preferably is polyethylene glycol monomethyl ether with $M_w$ comprised between 100 and 5000, preferably between 300 and 3500, even more preferably between 1000 and 2500. In a more preferred embodiment, the organic polymer material is PEG9 or PEG44. By the terms PEG9 and PEG44 is understood a polymer containing a polyethyleneoxy chain with 9 and 44 units of ethylene oxide, respectively.

The inorganic nanoparticles may be grafted with a single organic polymeric segment or with multiple organic polymeric segments. Preferably, the nanoparticles are grafted with 1 to 100 organic polymeric segments, more preferably with 1 to 20 organic segments.

In a particular embodiment, the nanoparticulate hybrid material which is grafted with the anion of the organic sodium or lithium salt and the organic polymer material has an organic content ranging from 15 to 50%, more preferably the organic content ranges from 20 to 40%.

The nanoparticulate organic hybrid material (NOHM) grafted with the anion of the organic salt and the organic polymeric segments exhibit liquid-like properties so that the NOHM moves freely and flows in the absence of a suspending solvent. Thus, NOHM are in the form of a self-suspended suspension, wherein the nanoparticles are loose.

In a particular embodiment, the nanoparticulate organic hybrid material has a formula (II):

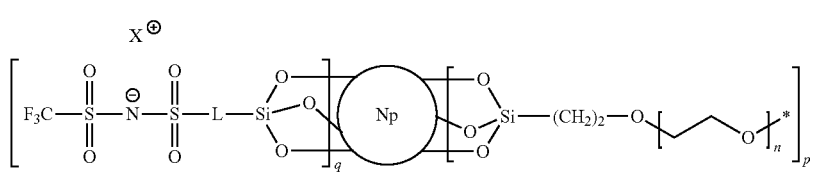

wherein:

(Np) represents an inorganic nanoparticle;
L is a $C_1$-$C_6$ alkylene or phenylene-$C_1$-$C_4$-alkylene group;
X+ is a sodium or lithium cation;
n is an integer ranging from 3 to 100;
q is an integer ranging from 1 to 100;
p is an integer ranging from 0 to 100.

In a preferred embodiment, L is selected from —(CH$_2$)$_3$— and phenylene-CH$_2$—CH$_2$—.

In another preferred embodiment, n ranges from 3 to 100, more preferably from 3 to 50, more preferably from 5 to 50.

In another preferred embodiment, q ranges from 1 to 20, more preferably from 1 to 10.

In another preferred embodiment, p ranges from 1 to 20, more preferably from 1 to 10.

In another preferred embodiment, the material constitutive of the inorganic nanoparticle is a metal oxide, more preferably is SiO$_2$.

In another particular embodiment of the invention, the nanoparticulate organic hybrid material is dispersed in a binder or plasticizer selected from PEG, polyethylene glycol dimethyl ether (PEGDME) and mixtures thereof in order to improve the ionic conductivity. Preferably, said binder is added to the hybrid material in amounts ranging from 1 to 50 wt % with respect to the weight of the hybrid material.

Alternatively, the nanoparticulate organic hybrid material is dispersed in a binder based on a polymer comprising a high fraction (≥60%) of CH$_2$CH$_2$O units, optionally plasticized with PEGDME, organic cyclic carbonates, γ-butyrolactone or tetralkyl sulfamides.

A second aspect of the present invention relates to a process for the preparation of the nanoparticulate organic hybrid material of the invention. Said process comprises attaching at least an anion of an organic sodium or lithium salt to an inorganic nanoparticle via a covalent bond through an organic linker.

In a particular embodiment, the process for obtaining the nanoparticulate organic hybrid material includes the reaction of a pre-synthesized organic salt bearing the linker L and reacting groups at one end, with complementary functional groups naturally present on or introduced onto the nanoparticles.

Thus, the process of the invention comprises reacting a compound of formula (III):

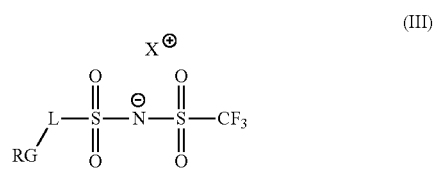

wherein:
RG is a reacting group;
L is a $C_1$-$C_6$ alkylene or phenylene-$C_1$-$C_4$-alkylene group; and
$X^{(+)}$ is a cation of a base,
with an inorganic nanoparticle,
in the presence of an inorganic sodium or lithium salt.

For example, the nanoparticulate organic hybrid materials are produced by dispersing the pre-synthesized organic salt of formula (III) and an inorganic nanoparticle within the same solution. Preferably, a pre-synthesized organic salt containing terminal reactive functional groups (e.g. alkoxysiloxane groups) is dissolved in water to form a dilute solution. The precursor core nanoparticles, stored in the form of an aqueous suspension, is diluted with an aqueous solution. Temporary hydrogen bonds are created between the organic salt and hydroxyl groups that have formed at the surface of the inorganic nanoparticles. The temporary bonds can then be cured between the inorganic nanoparticle core and the organic salt, resulting in permanent covalent bonds.

The reaction of the pre-synthesized organic salt with the functional groups of the nanoparticle is performed in the presence of an inorganic sodium o lithium salt, such as a lithium or sodium carbonate, in order to provide with the lithium or sodium cations.

In a preferred embodiment, the reacting groups present at one end of the pre-synthesized organic salt of formula (III) are alkoxysiloxane groups, such as (CH$_3$O)$_3$Si— or (C$_2$H$_5$O)$_3$Si—.

In another preferred embodiment, the material constitutive of the inorganic nanoparticle is SiO$_2$.

The pre-synthesized organic salt can be formed by reacting a compound of formula (IV):

wherein:
L is a $C_1$-$C_6$ alkylene or phenylene-$C_1$-$C_4$-alkylene group, and
RG is a reacting group,
with the compound:

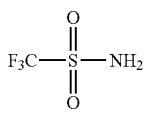

in the presence of a base.

The base can be for example triethylamine, so as the countercation of the compound of formula (III) would be $EtNH_3^{(+)}$.

Therefore, in a further preferred embodiment, the process of the invention comprises:

a) reacting a compound of formula (IVa):

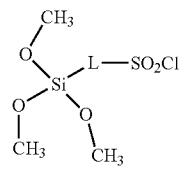
(IVa)

wherein L is a $C_1$-$C_6$ alkylene or phenylene-$C_1$-$C_4$-alkylen group,
with the compound:

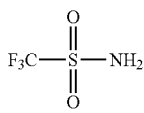

in the presence of a base,
to obtain a compound of formula (IIIa):

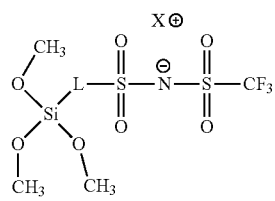
(IIIa)

b) reacting a nanoparticle of silicon dioxide with the compound of formula (IIIa) in the presence of a sodium or lithium carbonate.

In a particular embodiment, when the nanoparticulate organic hybrid material of the invention is also grafted with at least a single organic polymeric segment, the process for the preparation of said hybrid material also comprises attaching the organic polymeric segment to the inorganic nanoparticle. The organic polymer is also attached to the inorganic nanoparticle via a covalent bond.

The organic polymeric segments used in accordance to this embodiment can be produced by a variety of techniques known to those skilled in the art, including bulk, solution, dispersion, emulsion, condensation, anionic, free-radical and living radical polymerization.

The same methodology as described for the attachment of the organic salt to the nanoparticle can be used to attach the organic polymeric segment.

Therefore, one approach to produce said nanoparticle organic hybrid material is the "graft-to" methodology, which involves the reaction of a pre-synthesized polymer bearing reactive groups at one end of the chain with complementary functional groups naturally present on or introduced onto the nanoparticle.

For example, the nanoparticle organic hybrid material is produced by dispersing the reactive polymer, the pre-synthesized organic salt and the inorganic nanoparticle in the same solution. In particular, the pre-synthesized organic salt and the polymer, both containing terminal reactive functional groups (e.g. alkoxysiloxane) are dissolved in water to form a dilute solution. The precursor core nanoparticles, stored in the form of an aqueous suspension, is diluted with an aqueous solution. Temporary hydrogen bonds are created between the organic salt and hydroxyl groups that have formed at the surface of the inorganic nanoparticles and between the organic polymer and hydroxyl groups that have formed at the surface of the inorganic nanoparticles. The temporary bonds can then be cured between the inorganic nanoparticle core and the organic salt and between the inorganic core and the organic polymer, resulting in permanent covalent bonds.

In a preferred embodiment, both the organic salt and the organic polymer have alkoxysiloxanes as terminal reacting groups. In a further preferred embodiment, the organic polymer containing terminal reactive functional group is alkoxysiloxane-PEG-OH or alkoxysiloxane-PEG-epoxide.

In another preferred embodiment, the nanoparticles are composed of $SiO_2$.

In a further preferred embodiment, the process of the invention comprises:

a) reacting a compound of formula (IVa):

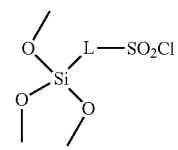
(IVa)

wherein L is a $C_1$-$C_6$ alkylene or phenylene-$C_1$-$C_4$-alkylene group,
with the compound:

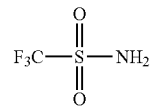

in the presence of a base,
to obtain a compound of formula (IIIa):

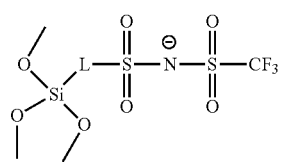
(IIIa)

b) reacting a nanoparticle of silicon dioxide with the compound of formula (IIIa) and with the compound of formula (V):

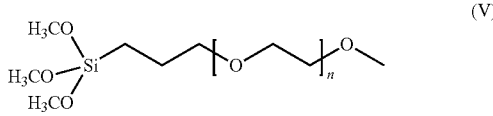

(V)

wherein n ranges from 3 to 100,
in the presence of a sodium or lithium carbonate.

In a preferred embodiment, n ranges from 5 to 50.

In all the embodiments, L is preferably selected from —(CH$_2$)$_3$— and -phenyl-CH$_2$—CH$_2$—.

In a particular embodiment, the process for the preparation of the nanoparticulate organic hybrid material further comprises subjecting the obtained nanoparticulate organic hybrid material to a dialysis process. This technique is widely known by a skilled person. It includes the separation of the suspended nanoparticulate hybrid material from dissolved ions or small molecules though the pores of a semipermeable membrane.

In a preferred embodiment, the process of the invention further comprises the addition of a binder selected from polyethylene oxide and polyethylene glycol dimethylether to the grafted nanoparticles.

The nanoparticulate organic hybrid material of the invention is useful for a wide range of application but, in particular, for the preparation of electrolytes for rechargeable batteries.

Thus, a further aspect of the present invention refers to an electrolyte suitable for its use in a sodium or lithium battery, said electrolyte comprising a nanoparticulate hybrid material as defined above.

Finally, another aspect of the invention relates to a lithium or sodium rechargeable battery comprising: (i) an electrolyte as describe above, (ii) a lithium or sodium anode, and (iii) a cathode.

EXAMPLES

Example 1: Synthesis of Triethylammonium 2-[(Trifluoromethanesulfonylimido)-N-4-sulfonyl-phenyl]ethyl trimethoxysilane This synthesis is carried out according to the process described in J. Am. Chem. Soc. 2009, 131, 2882. 2-(4-Chlorosulfonylphenyl) ethyltrimethoxysilane (2 g) was added under argon to a solution of trifluoromethanesulfonamide (1 g) and triethylamine (3.38 g) into 30 mL of methylene dichloride. The reaction mixture was stirred and heated at 40° C. overnight. An orange-brown-colored wax was obtained after distillation of the solvent.

Example 2: Synthesis of SiO$_2$ Nanoparticles Functionalized with the Anion of a Na Salt An alkaline stabilized dispersion of silica nanoparticles was diluted to 4 wt % particle fraction by addition of aqueous sodium hydroxide solution, pH~11 following the procedure described in J. Mater. Chem. 2011, 21, 10094. Triethylammonium 2-[(Trifluoromethanesulfonylimido)-N-4-sulfonylphenyl]ethyl-trimethoxysilane at a ratio of 1.5 g per 1.0 g SiO$_2$ nanoparticles was added dropwise at 100° C. Following, the reaction solution was heated for 12 hours at 100° C. After 24 hours, an excess of Na$_2$CO$_3$ in hot water was added to grafted SiO$_2$ nanoparticles to remove the triethylamine. After removing the water, the product was dialyzed with a cellulose acetate (supplier, Aldrich) for several days in water to remove any remaining free organosilane. Finally, MP-TsOH (macroporous polystyrene sulfonic acid) columns were used to remove any remaining triethylamine of dialyzed SiO$_2$ nanoparticles. SiO$_2$ nanoparticles functionalized with the anion of the sodium salt (i.e., trifluoromethanesulfonylimido-N-4-sulfonylphenyl) were obtained after distillation of the solvent.

FIG. 1 shows the characterization of such nanoparticles by TEM.

Example 3: Synthesis of SiO$_2$ Nanoparticles Functionalized with PEG and the Anion of a Na Salt An alkaline stabilized dispersion of silica nanoparticles was diluted to 4 wt % particle fraction by addition of aqueous sodium hydroxide solution, pH~11. [Methoxy (polyethyleneoxy)propyl]trimethoxysilane [0.75 g, M$_w$~600 (wherein the polyethyleneoxy chain has 9 units of ethylene oxide) or Mw~2130 (wherein the polyethyleneoxy chain has 44 units of ethylene oxide)] and triethylammonium 2-[(Trifluoromethanesulfonylimido)-N-4-sulfonylphenyl]ethyl-trimethoxysilane (0.75 g) were added to 1.0 g SiO$_2$ nanoparticles dropwise at 100° C. Following, the reaction solution was heated for 12 hours at 100° C. The next day, an excess of Na$_2$CO$_3$ in hot water was added to SiO$_2$ nanoparticles functionalized to remove the tryethylamine. After removing the water, the product was dialyzed for several days in water to remove any remaining free organosilane. Finally, SiO$_2$ nanoparticles functionalized with PEG-9 or PEG-44 and anion were obtained after distillation of the solvent.

Figure 2:
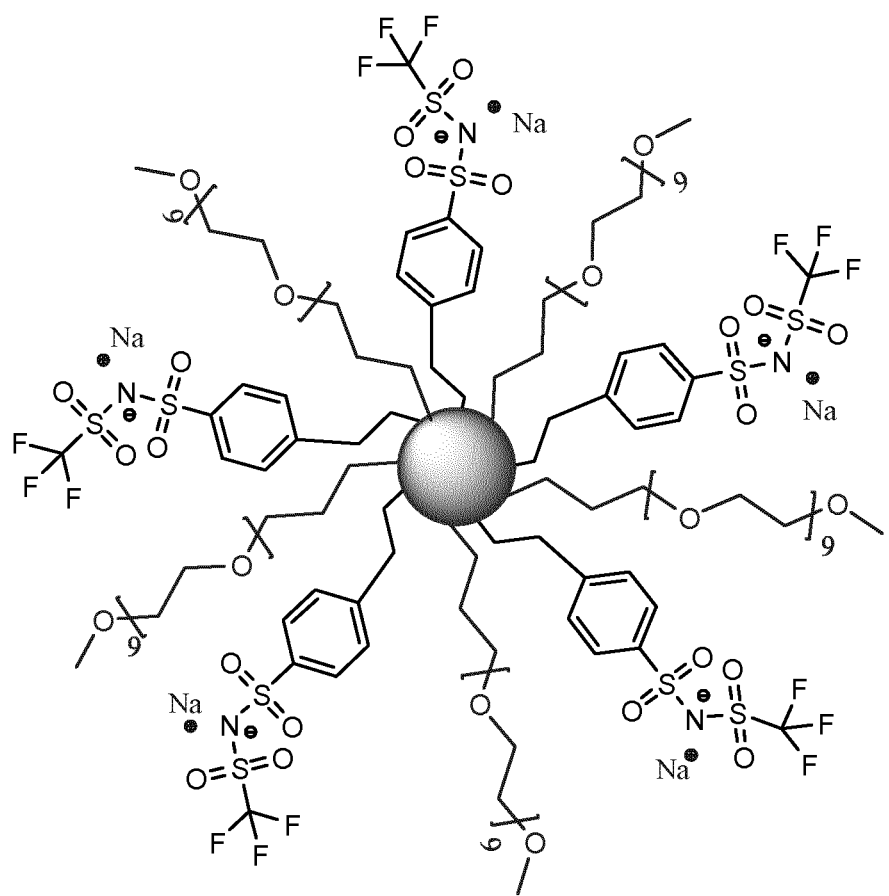
FIG. 2 shows the structure of $SiO_2$ nanoparticles grafted with PEG9 and the anion of the sodium salt ($SiO_2$-anion-PEG9) where L is phenyl ethyl and the Mw of the PEG is 600.

The chemical structure of the obtained SiO$_2$ nanoparticle grafted with the sodium salt and PEG-9 is depicted in FIG. 2.

Figure 3A:
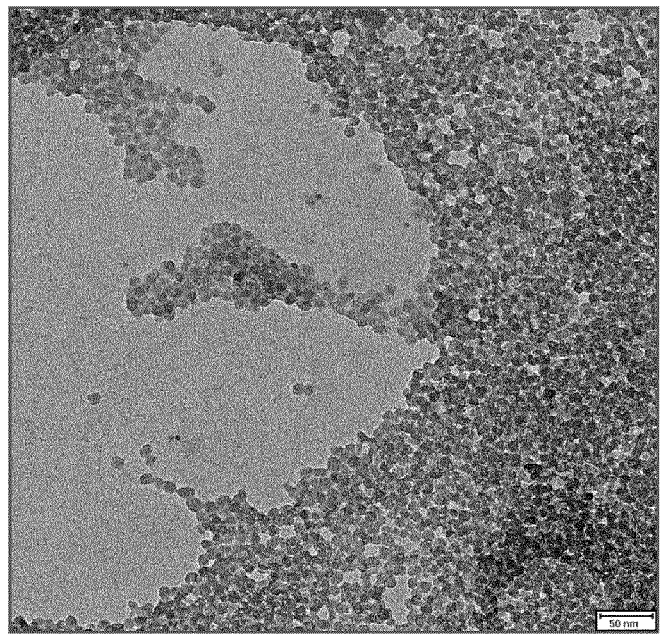
FIG. 3 shows the characterization of $SiO_2$ nanoparticles functionalized with the anion of the sodium salt and with a) PEG9 or b) PEG44 ($SiO_2$-anion-PEG9 and $SiO_2$-anion-PEG44) by Transmission Electron Microscopy (TEM).
Figure 3B:
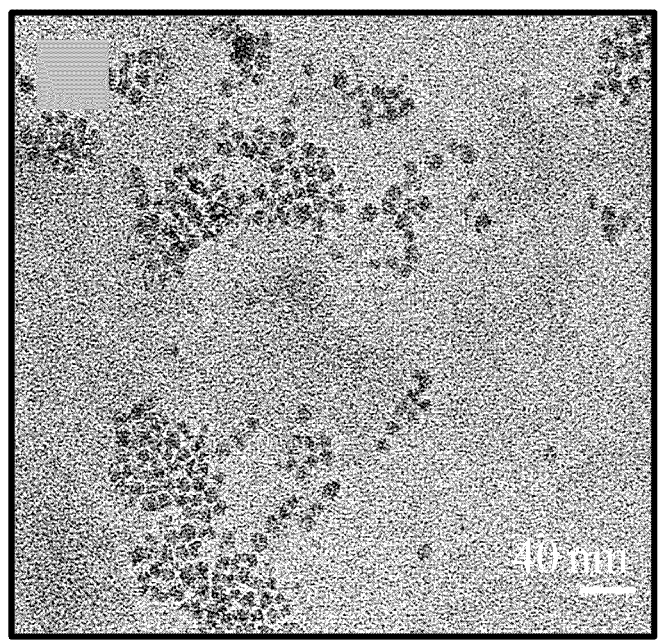

FIG. 3 shows the characterization of SiO$_2$ nanoparticles functionalized with PEG-9 or PEG-44 and the anion of the sodium salt by TEM.

Figure 4A:
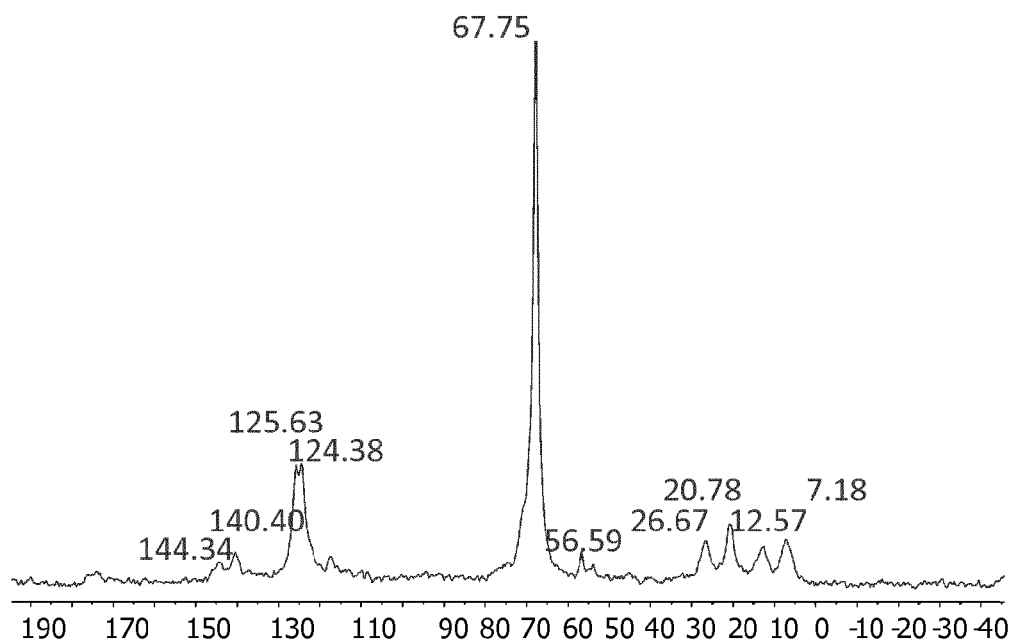
FIG. 4 shows the characterization of the $SiO_2$ nanoparticles grafted with PEG-9 and the anion of the sodium salt ($SiO_2$-anion-PEG9) by NMR (a) $^{13}C$; (b) $^{19}F$ and (c) $^{29}Si$.
Figure 4B:
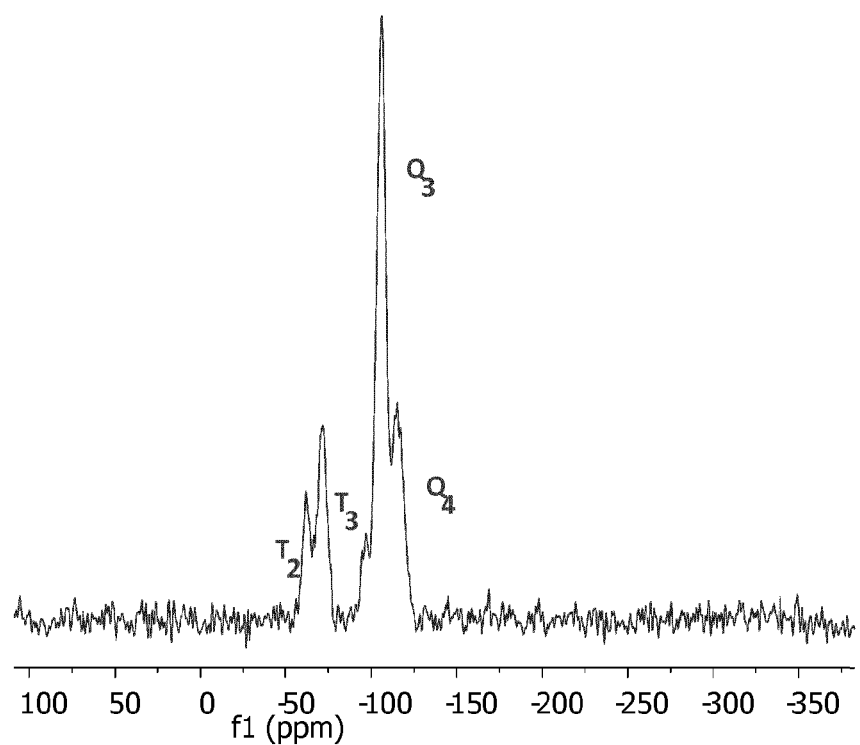
Figure 4C:
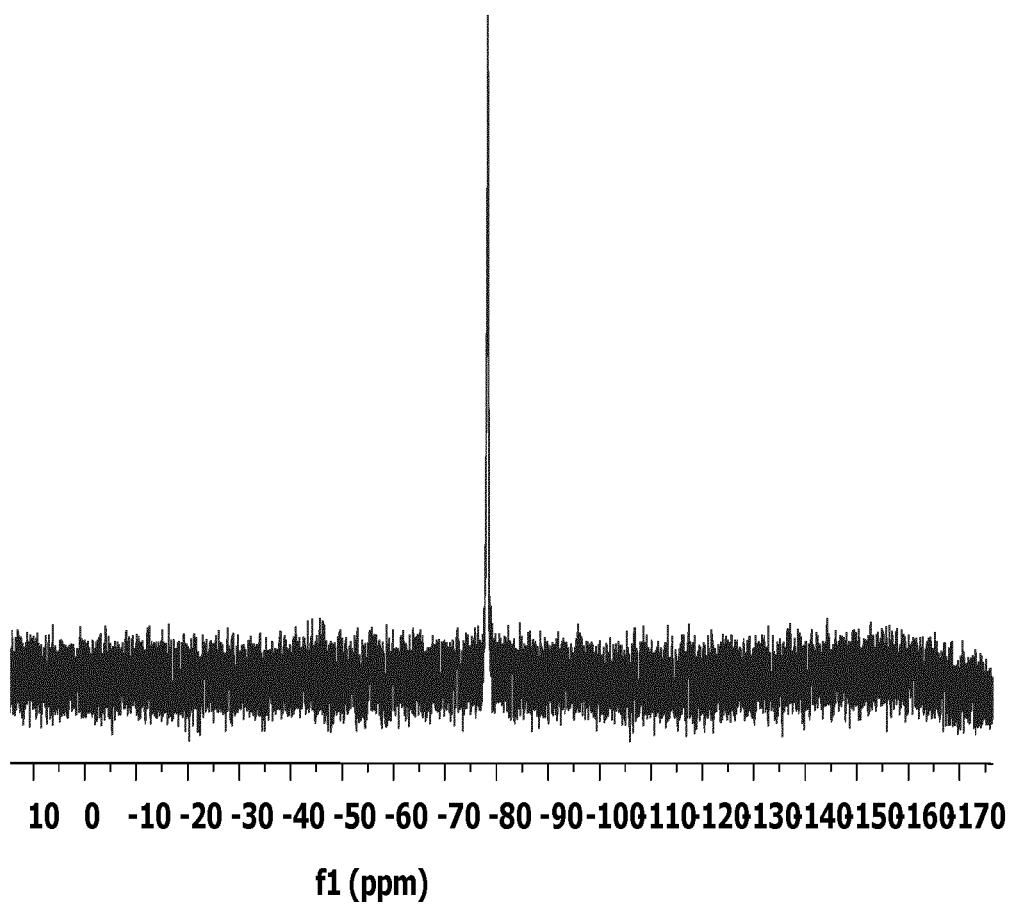

The hybrid nanoparticles obtained according to the procedure described in examples 2 and 3 were characterized by NMR confirming the organic functionalization of the inorganic nanoparticle. FIG. 4 shows the characterization of the SiO$_2$ nanoparticles grafted with PEG-9 and the anion of the sodium salt by $^{13}$C, $^{19}$F and $^{29}$Si NMR.

Figure 5:
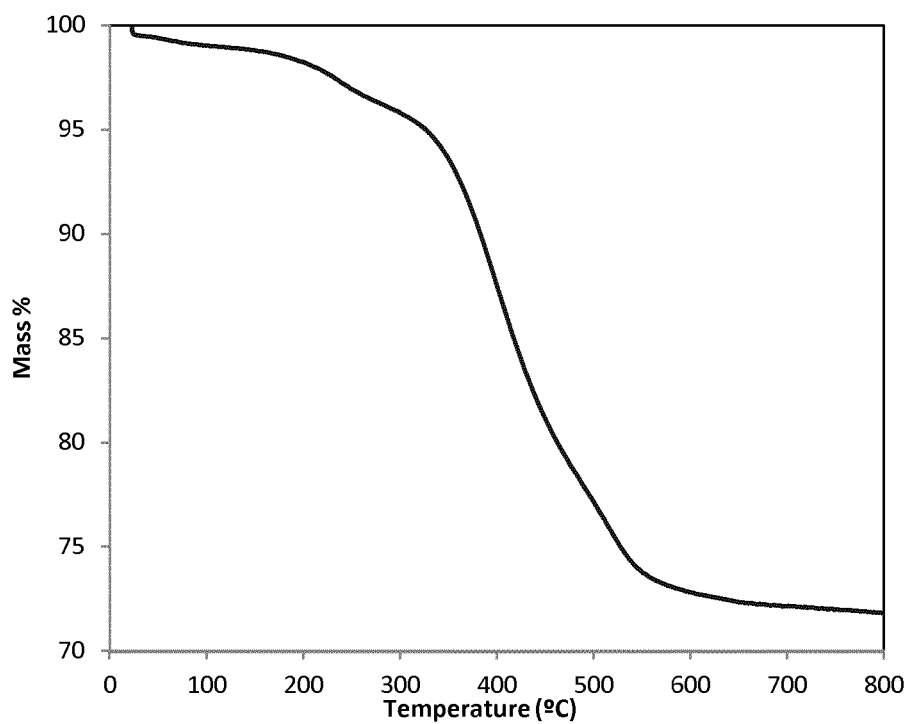
FIG. 5 shows the characterization of $SiO_2$ nanoparticles grafted with PEG9 and the anion of the sodium salt ($SiO_2$-anion-PEG9) by thermogravimetric analysis (TGA).

The organic content of each functionalized nanoparticle was obtained by measurements of thermogravimetric analysis (TGA). In this way, the organic content of SiO$_2$-anion-PEG44 (36%) is higher than SiO$_2$-anion-PEG9 (28%), which could be due to the fact that the chain of the polymer used to prepare SiO$_2$-anion-PEG44 nanoparticles is longer than the chain used to prepare SiO$_2$-anion-PEG44 nanoparticles. FIG. 5 shows the characterization of SiO$_2$-anion-PEG9 nanoparticles by TGA. The maximum weight loss rate temperature (T$_{max}$) is approximately 310° C. for both hybrid nanoparticles.

Therefore, these hybrid nanoparticles show a good thermal stability to be used as polymer electrolytes.

The organic content of SiO$_2$-anion nanoparticles (18%) is lower than SiO$_2$-anion-PEG nanoparticles which could be due to the double functionalization (PEG and the anion of the sodium salt) in SiO$_2$-anion-PEG nanoparticles.

Figure 6:
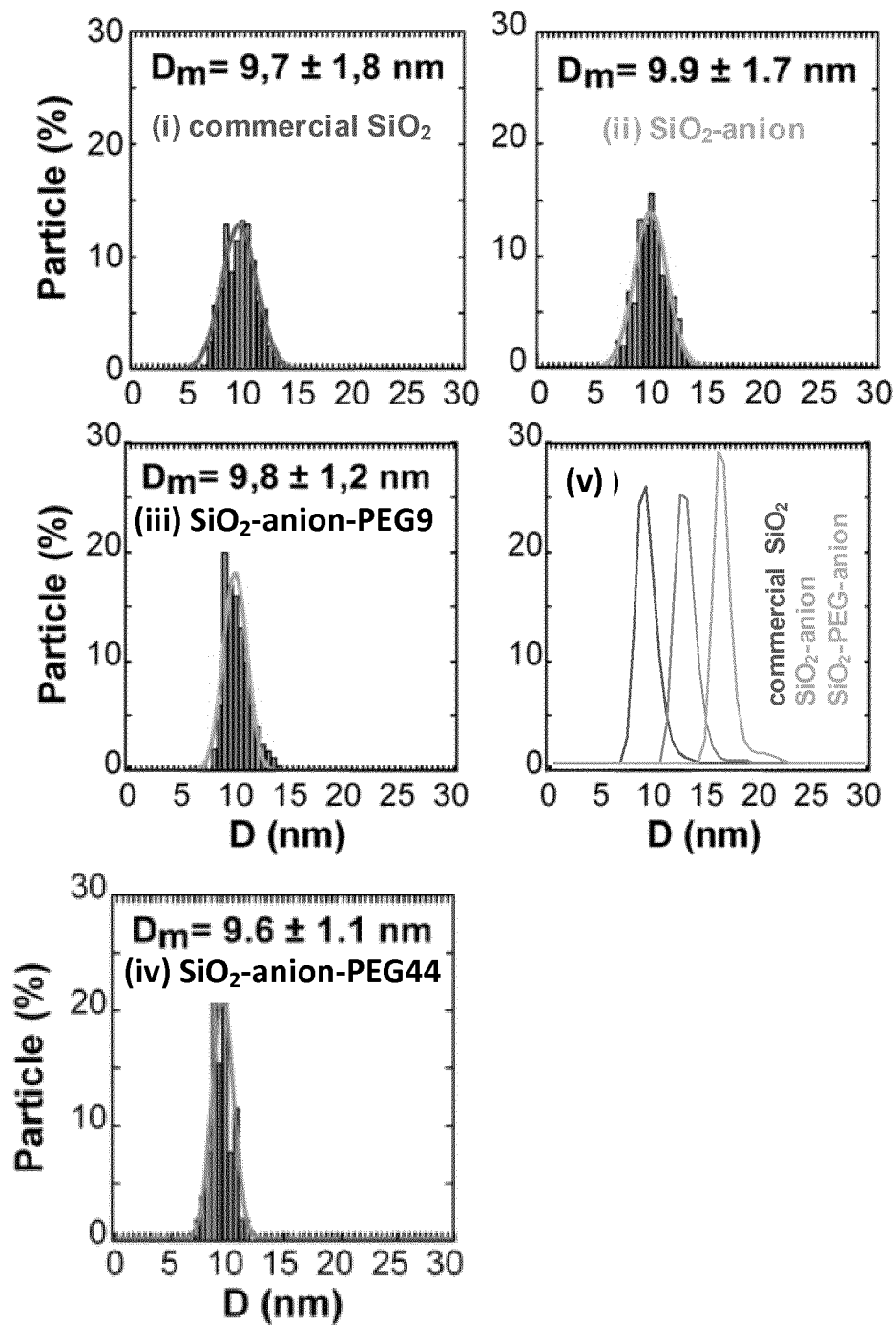
FIG. 6 shows histograms of TEM measurements of (i) commercial $SiO_2$ nanoparticles; (ii) $SiO_2$-anion nanoparticles; (iii) $SiO_2$-anion-PEG9 nanoparticles; (iv) $SiO_2$-anion-PEG44 nanoparticles and (v) DLS measurements of commercial $SiO_2$ nanoparticles, $SiO_2$-anion nanoparticles and $SiO_2$-anion-PEG9 nanoparticles.

The size of all nanoparticles was measured by transmission electron microscopy (TEM) and dynamic light scattering measurements (DLS). As shown in FIG. 6 (*i-iv*), $SiO_2$ nanocores show sizes of approximately 10 nm all of them. DLS measurements (FIG. 6(*v*)) indicate that hybrid nanoparticles, $SiO_2$-anion, $SiO_2$-anion-PEG9 and $SiO_2$-anion-PEG44, present sizes of approximately 14, 18 and 25, respectively. Therefore, these nanoparticles are comprised of approximately 4, 8 and 15 nm organic shells to each $SiO_2$ nanocores. Furthermore, the size of un-functionalized $SiO_2$ nanoparticles was confirmed by DLS measurements, which was satisfyingly very similar to the value deduced from TEM (approximately 10 nm).

Example 4: Preparation of Polymer/$SiO_2$ Nanohybrid Electrolytes and Measurements of $Na^+$ Conductivity A dispersion of $SiO_2$ nanoparticles functionalized with the anion of the Na salt and obtained according to the procedure described in example 2 was prepared in methanol and water. The dispersion of grafted $SiO_2$ nanoparticles (0.013 g is equivalent to 1 mol of Na) was added to a mixture of polyethylene glycol dimethyl ether (PEGDME, 0.050 g, $M_w$=250) and polyethylene oxide (PEO, 0.050 g, $M_w$=5× $10^6$) at ratio 1:1 in weight. After mixing, samples were dried in the convection oven at 80° C. overnight and for at least 24 hours under vacuum.

In the same way, a dispersion of $SiO_2$ nanoparticles functionalized with polyethylene glycol (PEG9) (Mw~470) and the sodium salt and obtained according to the procedure described in example 3, was immersed into a matrix of polyethylene oxide (PEO, Mw~5.$10^6$) and polyethylenglycol dimethylether (PEGDME, Mw~250) at ratio 1:1 in weight. After mixing, samples were dried in the convection oven at 80° C. overnight and for at least 24 hours under vacuum.

A study of the relationship between the sodium ion concentration and the ionic conductivity was performed. For this, several polymer electrolytes (Table I) were prepared with 20 units of ethylene oxide of the polymers with respect to different amount of sodium (in moles) (EO/NA~40 or 20 or 10 or 6.5).

TABLE I

Nomenclature of the polymer electrolytes

| Polymer electrolytes | PEO:PEGDME | EO/Na |
|---|---|---|
| $SiO_2$-anion (EO/Na~40) | 1 g:1 g | 40 |
| $SiO_2$-anion (EO/Na~20) | | 20 |
| $SiO_2$-anion (EO/Na~10) | | 10 |
| $SiO_2$-anion (EO/Na~6.5) | | 6.5 |
| $SiO_2$-PEG9-anion (EO/Na~40) | 1 g:1 g | 40 |
| $SiO_2$-PEG9-anion (EO/Na~20) | | 20 |
| $SiO_2$-PEG9-anion (EO/Na~10) | | 10 |
| $SiO_2$-PEG9-anion (EO/Na~6.5) | | 6.5 |

The hybrid polymer electrolytes obtained were characterized electrochemically with complex impedance measurements.

The ionic conductivity measurement of the polymer electrolytes were carried out by AC impedance spectroscopic technique using a Solartron 1260 over the frequency range from 1 Hz to 1 MHz with a signal level of 10 mV. The conductivity measurements of polymer electrolytes were carried out by sandwiching the samples between two stainless-steel (SS) electrodes. The temperature dependence of the ionic conductivity was performed in a temperature range from 25 to 80° C.

Figure 7A:
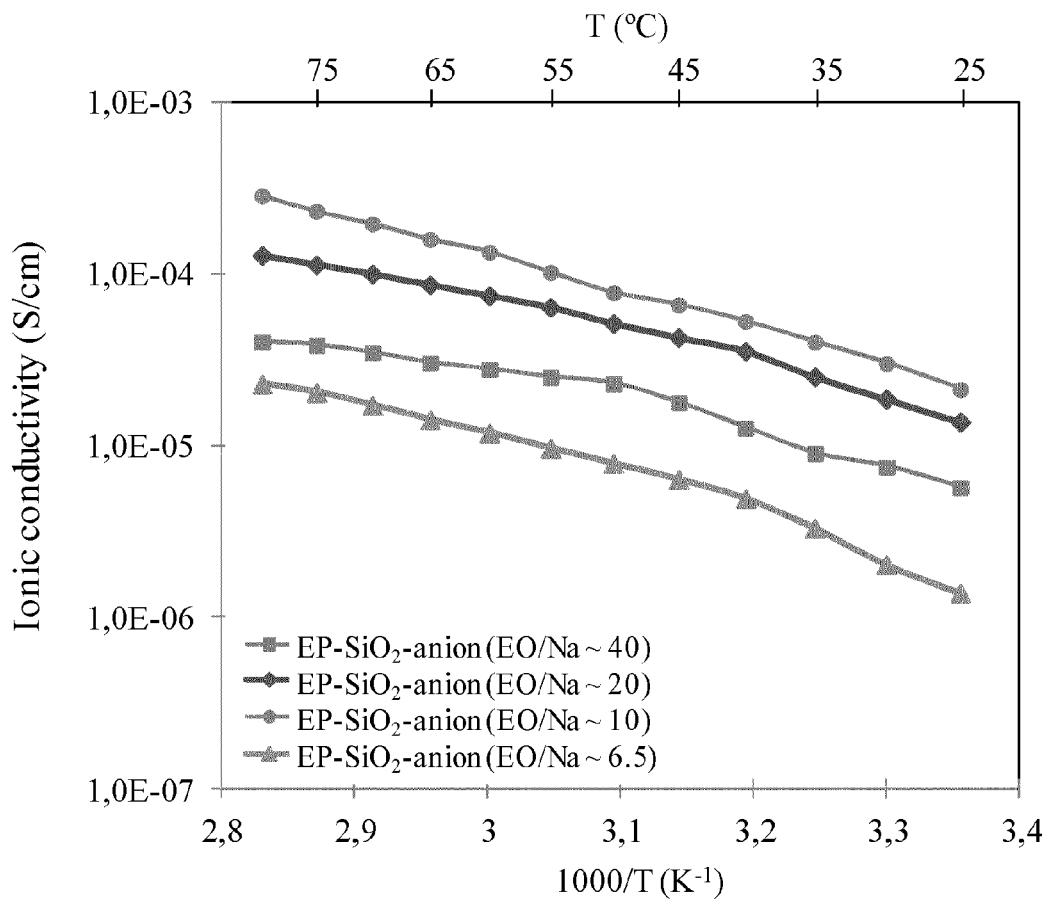
FIG. 7 shows the ionic conductivity of the polymer electrolytes prepared by: a) $SiO_2$-anion and b) $SiO_2$—PEG9-anion nanoparticles.
Figure 7B:
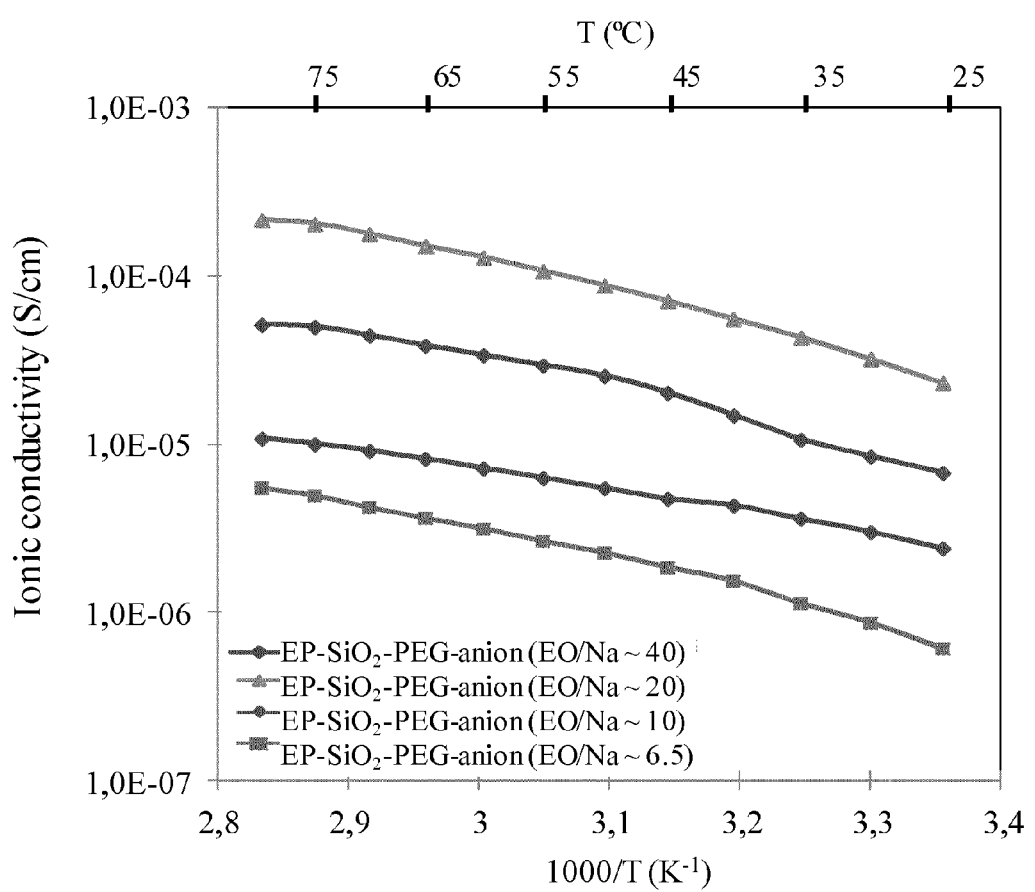

FIG. 7 shows the ionic conductivity of the polymer electrolytes prepared by: a) $SiO_2$-anion and b) $SiO_2$—PEG9-anion nanoparticles.

As can be seen in FIG. 7, the ionic conductivity increases with temperature in both hybrid polymer electrolytes ($SiO_2$-anion and $SiO_2$-anion-PEG). The polymer electrolytes prepared by $SiO_2$-anion nanoparticles present the highest ionic conductivity with 2 moles of sodium ions (0.026 g of $SiO_2$-anion per 0.100 g of PEO-PEGDME), while beyond this concentration, the conductivity decreases for these electrolytes. This behavior could be due to an excess of nanoparticles, which generates a hindrance in the mobility of the sodium ions into the polymer matrix. The polymer electrolytes prepared by $SiO_2$—PEG-anion nanoparticles present the highest ionic conductivity with 1 mol of sodium ions (0.020 g of $SiO_2$—PEG-anion).

Figure 8:
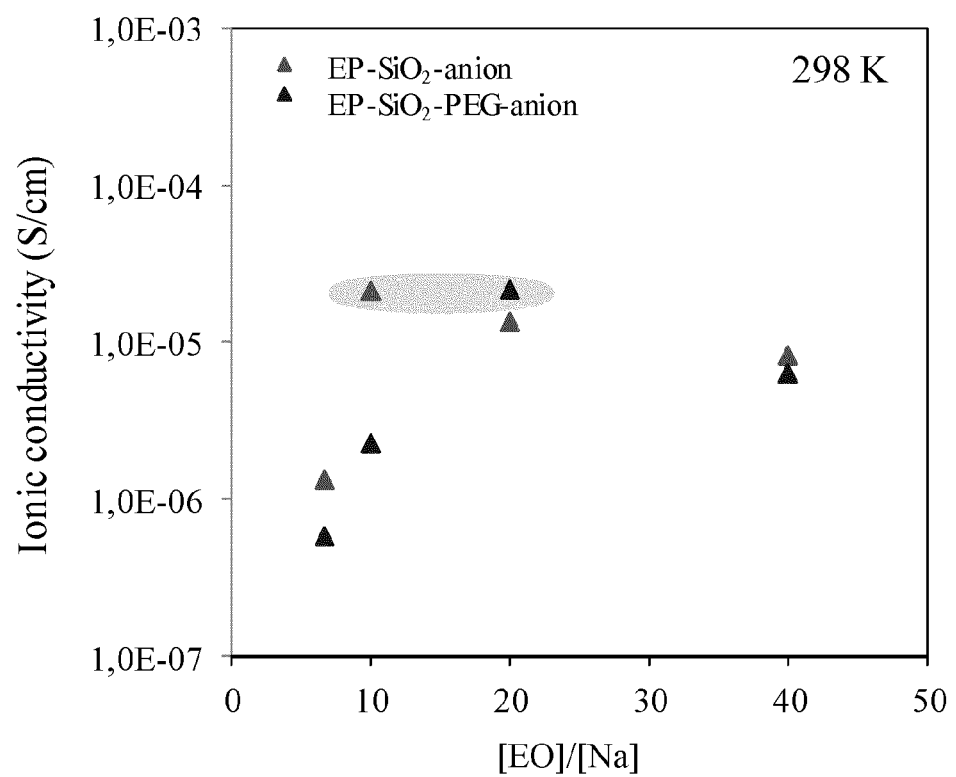
FIG. 8 shows the ionic conductivities of $SiO_2$-anion and $SiO_2$-anion-PEG9 electrolytes at room temperature.

On the other hand, the ionic conductivities of both hybrid electrolytes ($SiO_2$-anion and $SiO_2$—PEG-anion) are compared at room temperature in FIG. 8, showing that $SiO_2$—PEG-anion electrolytes with a ratio EO/Na~20 have an ionic conductivity very similar to $SiO_2$-anion electrolytes with a ratio EO/Na~10. Hence, $SiO_2$—PEG-anion electrolytes require fewer sodium ions to obtain ionic conductivities of ~$10^{-5}$ S/cm.

Finally, the electrochemical windows of $SiO_2$-anion (EO/Na~10) and $SiO_2$—PEG-anion (EO/Na~20) electrolytes (that have the highest ionic conductivities), were evaluated by cyclic voltammetry measurements showing a very similar electrochemical window, 4.4V and 3.8V, respectively.

Example 5: Preparation of Polymer/$SiO_2$ Nanohybrid Electrolytes with Different Amounts of PEGDME and Measurements of Ionic Conductivity A dispersion of $SiO_2$ nanoparticles functionalized with PEG9 or PEG44 and the anion of the socium salt, obtained following the procedure described in example 3, was prepared in water. Polymer electrolytes were synthesized by immersion of $SiO_2$ nanoparticles (grafted with PEG and Na salt) in different amounts (50 wt %, 30 wt %, 10 wt % and 0 wt %) of the plasticizer PEGDME 5 ($M_w$=250). After mixing, samples were dried in the convection oven at 80° C. overnight and for at least 24 hours under vacuum.

Figure 9A:
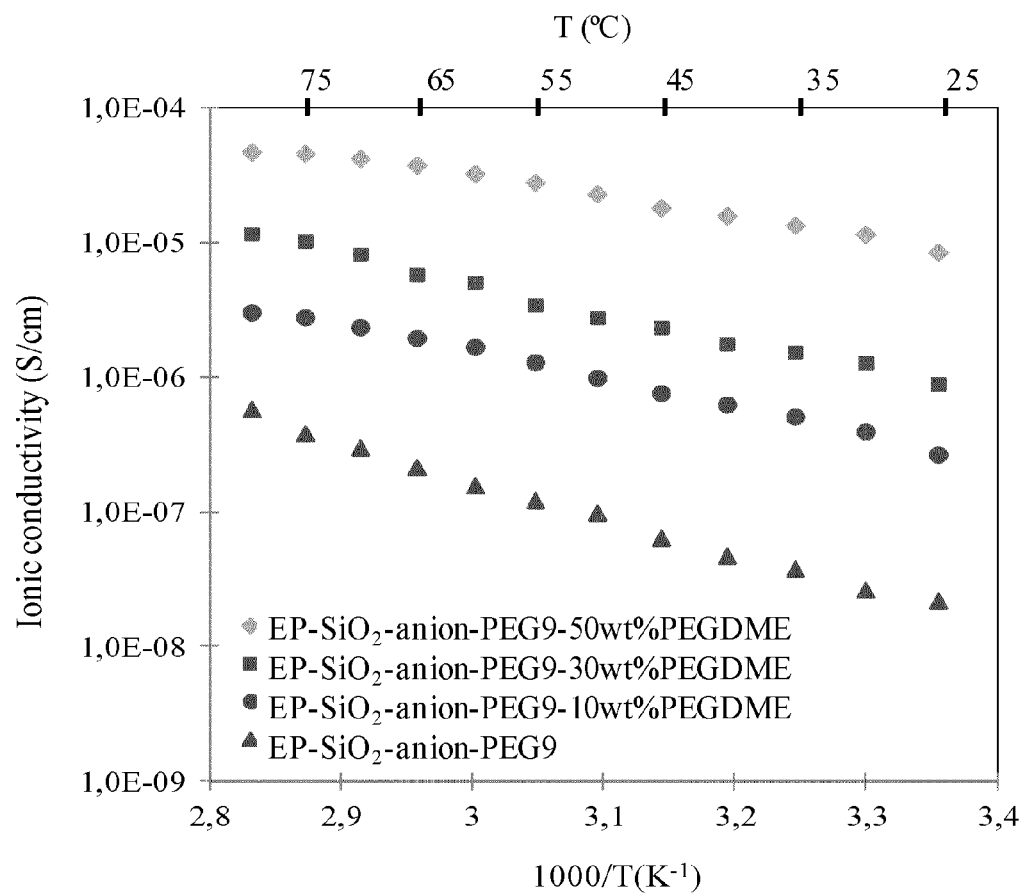
FIG. 9 shows the ionic conductivity of the polymer electrolytes prepared by: a) $SiO_2$-anion-PEG9 and b) $SiO_2$-anion-PEG44 nanoparticles in the presence of different amounts of PEGDME.
Figure 9B:
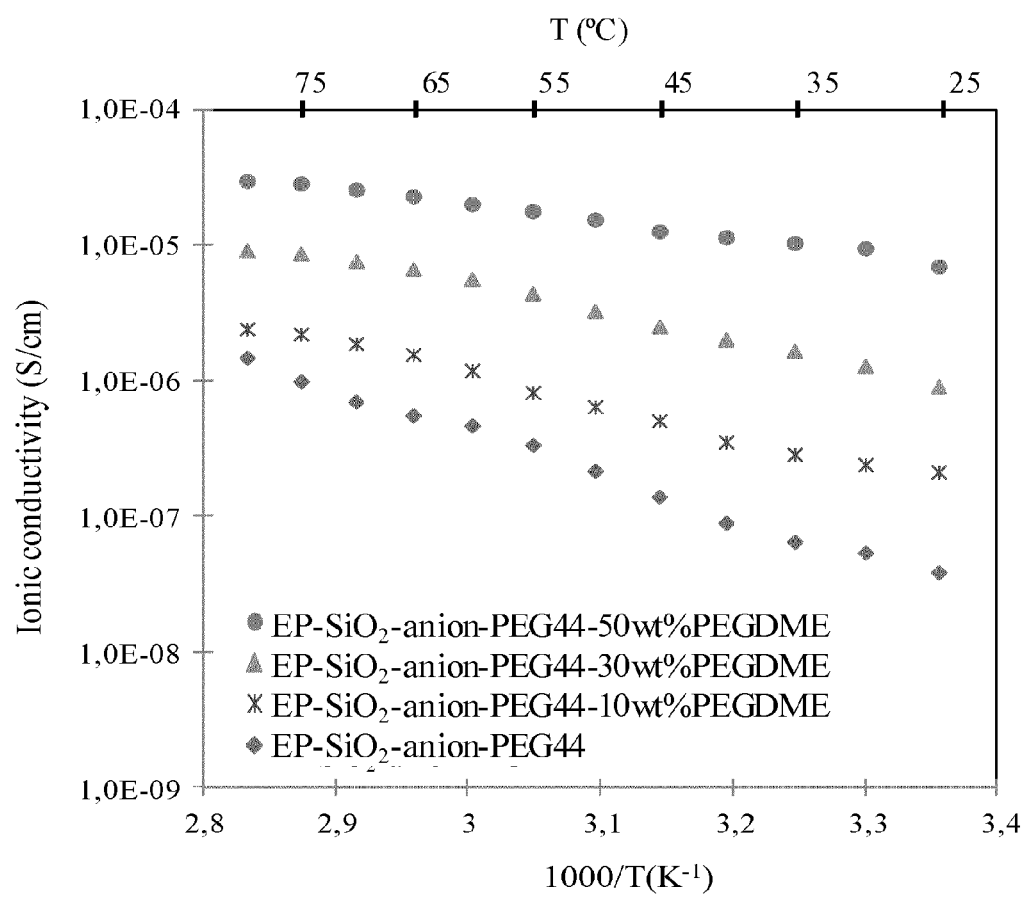

Once the polymer electrolytes were prepared, their effect on the ionic conductivity was studied. FIG. 9 shows the ionic conductivity of the polymer electrolytes prepared by: a) $SiO_2$-anion-PEG9 and b) $SiO_2$-anion-PEG44 nanoparticles. As can be seen, the ionic conductivity increases with the temperature and with the addition of PEGDME for both hybrid polymer electrolytes ($SiO_2$-anion-PEG9 and $SiO_2$-anion-PEG44). Furthermore the ionic conductivity is very similar for both hybrid electrolytes, regardless of the amount of plasticizer added.

A maximum conductivity of ~$10^{-5}$ S/cm is observed both for the hybrid polymer electrolyte prepared by $SiO_2$-anion-PEG9 or $SiO_2$-anion-PEG44 nanoparticles and 50 wt % PEGDME at room temperature. Hence, these values of ionic conductivities so similar seem to indicate that the grafting of the nanoparticle with polymer of molecular weight ~470 or ~2010 has not influence on the ionic conductivity of hybrid nanoparticles. However, the mechanical properties of $SiO_2$-anion-PEG44-50 wt % PEGDME electrolyte are better than that for $SiO_2$-anion-PEG9-50 wt % PEGDME electrolyte. Such fact could be attributed to the higher molecular weight of the PEG44.

Finally, the electrochemical window of $SiO_2$-anion-PEG44-50% wt PEGDME electrolyte (the one with highest ionic conductivity with good mechanical properties) was evaluated by cyclic voltammetry measurements using stainless-steel electrodes. The resulting potential window was ~5.0V, which is an acceptable working voltage range for device applications, particularly as a polymer electrolyte in sodium rechargeable batteries.

What is claimed is:

1. A nanoparticulate organic hybrid material comprising inorganic nanoparticles covalently grafted with at least one anion of an organic sodium or lithium salt through a linker group, said nanoparticulate hybrid material having the following formula (I):

$$F_3C-\underset{\underset{O}{\overset{O}{\|}}}{S}-\overset{X^\oplus}{\underset{}{N^\ominus}}-\underset{\underset{O}{\overset{O}{\|}}}{S}-L-Np \quad (I)$$

wherein:
Np represents the inorganic nanoparticle;
L is the linker group selected from $C_1$-$C_6$ alkylene and phenyl-$C_1$-$C_4$-alkylene group, $$F_3C-\underset{\underset{O}{\overset{O}{\|}}}{S}-N^\ominus-\underset{\underset{O}{\overset{O}{\|}}}{S}-$$

is the anion of the organic sodium or lithium salt, and
X+ is a sodium or lithium cation.

2. The nanoparticulate organic hybrid material according to claim 1, wherein the inorganic nanoparticles are composed of $SiO_2$.

3. The nanoparticulate organic hybrid material according to claim 1, wherein L is selected from —$(CH_2)_3$— and -phenylene-$CH_2$—$CH_2$—.

4. The nanoparticulate organic hybrid material according to claim 1, wherein the inorganic nanoparticles are further grafted with at least an organic polymeric segment.

5. The nanoparticulate organic hybrid material according to claim 4, wherein the organic polymeric segment is a polyethylene glycol segment.

6. The nanoparticulate organic hybrid material according to claim 1, further comprising a binder selected from the group consisting of polyethylene oxide, polyethylene glycol dimethylether and mixtures thereof.

7. A process for the preparation of a nanoparticulate organic hybrid material as defined in claim 1, said process comprising reacting a compound of formula (III):

$$\underset{RG}{\overset{L}{\diagup}}-\underset{\underset{O}{\overset{O}{\|}}}{S}-\overset{X^\oplus}{\underset{}{N^\ominus}}-\underset{\underset{O}{\overset{O}{\|}}}{S}-CF_3 \quad (III)$$

wherein:
RG is a reacting group;
L is a $C_1$-$C_6$ alkylene or phenylene-$C_1$-$C_4$-alkylene group; and
X(+) is a cation of a base,
with an inorganic nanoparticle,
in the presence of an inorganic sodium or lithium salt.

8. The process according to claim 7, wherein compound of formula (III) is prepared by reacting a compound of formula (IV):

$$\underset{RG}{\overset{L-SO_2Cl}{\diagup}} \quad (IV)$$

wherein:
L is a $C_1$-$C_6$ alkylene or phenylene-$C_1$-$C_4$-alkylene group, and
RG is a reacting group,
with the compound:

$$F_3C-\underset{\underset{O}{\overset{O}{\|}}}{S}-NH_2$$

in the presence of a base.

9. The process according to claim 7, wherein the reactive group is an alkoxysiloxane group.

10. The process according to claim 7, wherein the inorganic nanoparticle is composed of $SiO_2$.

11. The process according to claim 7, wherein the inorganic nanoparticles are further grafted with at least an organic polymeric segment, said process further comprises attaching the organic polymeric segment to the inorganic nanoparticle through a covalent bond.

12. The process according to claim 11, which further comprises the addition of a binder selected from the group consisting of polyethylene oxide, polyethylene glycol dimethylether and mixtures thereof to the grafted nanoparticles.

13. The process according to claim 7, which further comprises the addition of a binder selected from the group consisting of polyethylene oxide, polyethylene glycol dimethylether and mixtures thereof to the grafted nanoparticles.

14. An electrolyte suitable for its use in a sodium or lithium battery, said electrolyte comprising a nanoparticulate organic hybrid material as defined in claim 1.

15. A sodium or lithium battery which comprises an electrolyte as defined in claim 14.

16. A nanoparticulate organic hybrid material having a formula (II):

$$\left[F_3C-\underset{\underset{O}{\overset{O}{\|}}}{S}-\overset{X^\oplus}{\underset{}{N^\ominus}}-\underset{\underset{O}{\overset{O}{\|}}}{S}-L-Si\underset{O-}{\overset{O-}{\diagdown}}\underset{q}{\Big|}\overset{}{\underset{}{\text{Np}}}\underset{O-}{\overset{O-}{\diagup}}Si-(CH_2)_2-O\underset{n}{\sim\!\sim\!\sim}O\overset{*}{\Big]}_p \quad (II)$$

wherein;
Np represents an inorganic nanoparticle,
L is a $C_1$-$C_6$ alkylene or phenylene-$C_1$-$C_4$-alkylene group;
X+ is a sodium or lithium cation;
n is an integer ranging from 3 to 100;
q is an integer ranging from 1 to 100;
p is an integer ranging from 0 to 100.

* * * * *